United States Patent
Sakai et al.

(10) Patent No.: US 10,411,867 B2
(45) Date of Patent: Sep. 10, 2019

(54) COMMUNICATION APPARATUS AND COMMUNICATION METHOD

(71) Applicant: SONY CORPORATION, Tokyo (JP)

(72) Inventors: Eisuke Sakai, Tokyo (JP); Takeshi Itagaki, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/562,953

(22) PCT Filed: Feb. 23, 2016

(86) PCT No.: PCT/JP2016/055216
§ 371 (c)(1),
(2) Date: Sep. 29, 2017

(87) PCT Pub. No.: WO2016/174904
PCT Pub. Date: Nov. 3, 2016

(65) Prior Publication Data
US 2018/0115403 A1    Apr. 26, 2018

(30) Foreign Application Priority Data
Apr. 30, 2015  (JP) .................... 2015-092707

(51) Int. Cl.
*H04L 5/00* (2006.01)
*H04W 4/06* (2009.01)
(Continued)

(52) U.S. Cl.
CPC .......... *H04L 5/0055* (2013.01); *H04L 1/1893* (2013.01); *H04W 4/06* (2013.01);
(Continued)

(58) Field of Classification Search
CPC .................... H04W 72/005; H04L 1/1607
See application file for complete search history.

(56) References Cited

U.S. PATENT DOCUMENTS 4,839,582 A * 6/1989 Fukaya ............... G01R 23/173
324/76.19
6,223,286 B1 * 4/2001 Hashimoto ......... H04L 12/1868
380/280
(Continued)

FOREIGN PATENT DOCUMENTS

JP    2005-354181 A    12/2005
JP    2007-214920 A    8/2007
(Continued)

OTHER PUBLICATIONS

International Search Report dated May 17, 2016 in PCT/JP2016/055216 filed Feb. 23, 2016.

*Primary Examiner* — Parth Patel
(74) *Attorney, Agent, or Firm* — Xsensus LLP

(57) ABSTRACT

[Object] To provide a communication apparatus and a communication method that enable reinforcement of reliability of multicast communication and effective utilization of wireless communication resources to be compatible.
[Solution] Provided is a communication apparatus including: a communication unit configured to perform communication of a frame. The communication unit transmits a frequency allocation frame, which includes frequency allocation information that specifies a transmission frequency of a delivery acknowledgment response frame with respect to a multicast frame, and receives the delivery acknowledgment response frame that is transmitted in the transmission frequency specified by the frequency allocation information and is frequency-division multiplexed.

16 Claims, 11 Drawing Sheets

(51) Int. Cl.
*H04W 28/04* (2009.01)
*H04L 1/18* (2006.01)
*H04W 72/04* (2009.01)
*H04W 4/48* (2018.01)
*H04W 84/12* (2009.01)

(52) U.S. Cl.
CPC ............ *H04W 4/48* (2018.02); *H04W 28/04* (2013.01); *H04W 72/0446* (2013.01); *H04W 84/12* (2013.01)

(56) References Cited

U.S. PATENT DOCUMENTS

| | | | | |
|---|---|---|---|---|
| 7,127,655 | B2* | 10/2006 | Chandhok | H04L 12/1868 714/748 |
| 9,883,490 | B1* | 1/2018 | Hedayat | H04W 72/0453 |
| 10,070,418 | B2* | 9/2018 | Liu | H04L 5/0023 |
| 2003/0048784 | A1* | 3/2003 | Murai | H04L 12/18 370/390 |
| 2004/0053622 | A1* | 3/2004 | Nakakita | H04L 63/0428 455/450 |
| 2007/0189207 | A1* | 8/2007 | Sammour | H04L 1/1614 370/328 |
| 2007/0223611 | A1* | 9/2007 | Ode | H04L 5/0007 375/260 |
| 2008/0095109 | A1* | 4/2008 | Malladi | H04L 1/1858 370/330 |
| 2008/0159205 | A1* | 7/2008 | Sekiya | H04L 1/1685 370/328 |
| 2008/0165717 | A1* | 7/2008 | Chen | H04W 72/005 370/312 |
| 2008/0209301 | A1* | 8/2008 | Chang | H04L 1/1607 714/749 |
| 2009/0052363 | A1* | 2/2009 | Matsue | H04L 12/1868 370/312 |
| 2009/0116416 | A1* | 5/2009 | Sekiya | H04L 1/1614 370/310 |
| 2009/0316811 | A1* | 12/2009 | Maeda | H04W 76/11 375/260 |
| 2010/0014520 | A1* | 1/2010 | Matsumoto | H04L 12/1868 370/390 |
| 2010/0061285 | A1* | 3/2010 | Maeda | H04W 4/06 370/312 |
| 2010/0118825 | A1* | 5/2010 | Kawamura | H04L 5/0007 370/330 |
| 2011/0205981 | A1* | 8/2011 | Koo | H04L 1/1671 370/329 |
| 2012/0106427 | A1* | 5/2012 | Nakae | H04L 12/1868 370/312 |
| 2012/0314824 | A1* | 12/2012 | Fujimura | H04B 1/1036 375/350 |
| 2013/0322396 | A1* | 12/2013 | Jiang | H04W 16/14 370/329 |
| 2014/0036737 | A1* | 2/2014 | Ekpenyong | H04W 8/245 370/280 |
| 2014/0355461 | A1* | 12/2014 | Aldana | G01S 5/00 370/252 |
| 2015/0110026 | A1* | 4/2015 | Lee | H04B 7/2656 370/329 |
| 2015/0204964 | A1* | 7/2015 | Hirano | G01S 5/12 370/252 |
| 2015/0245315 | A1* | 8/2015 | Kawasaki | H04W 4/06 370/312 |
| 2016/0157266 | A1* | 6/2016 | Wang | H04W 74/004 370/336 |
| 2016/0249345 | A1* | 8/2016 | Takeda | H04L 5/00 |
| 2016/0302229 | A1* | 10/2016 | Hedayat | H04B 7/0452 |
| 2017/0149547 | A1* | 5/2017 | Kim | H04B 7/26 |
| 2017/0279590 | A1* | 9/2017 | Choi | H04W 72/1278 |
| 2017/0279673 | A1* | 9/2017 | Itagaki | H04J 11/00 |
| 2017/0331587 | A1* | 11/2017 | Kim | H04L 1/1614 |
| 2017/0366321 | A1* | 12/2017 | Kim | H04L 1/1671 |
| 2018/0054810 | A1* | 2/2018 | Shinohara | H04W 72/04 |
| 2018/0084540 | A1* | 3/2018 | Takeda | H04L 5/0044 |
| 2018/0115433 | A1* | 4/2018 | Morioka | H04W 28/04 |
| 2018/0115975 | A1* | 4/2018 | Takeda | H04J 3/00 |
| 2018/0206082 | A1* | 7/2018 | Zhang | H04W 4/08 |

FOREIGN PATENT DOCUMENTS

| | | |
|---|---|---|
| JP | 2009-49704 A | 3/2009 |
| JP | 2010-503291 A | 1/2010 |
| JP | 2014-103582 A | 6/2014 |

* cited by examiner

COMMUNICATION APPARATUS AND COMMUNICATION METHOD

TECHNICAL FIELD

The present disclosure relates to communication apparatuses and communication methods.

BACKGROUND ART

Wireless local area networks (LANs), typified by IEEE (Institute of Electrical and Electronics Engineers) 802.11, have in recent years been widespread, leading to an increase in the number of wireless LAN-capable products.

Technologies for performing efficient communication between a plurality of communication apparatuses have been developed to respond to a trend. A multicast scheme in which frames are transmitted to one or a plurality of communication apparatuses at one time is one of the technologies.

Here, it may be desirable to give a delivery acknowledgment (which will also be referred to as an acknowledgment (ACK) below) with respect to multicast frames, like unicast frames, in view of a reinforcement of reliability of communication. A block ACK (BA), which is a delivery acknowledgment with respect to a plurality of frames, is such a delivery acknowledgment.

For example, Patent Literature 1 discloses an invention relating to a wireless communication apparatus which performs transmission of a block ACK request (BAR) frame indicating a request for transmission of a BA frame and reception of a BA frame that is a response to the BAR frame for each terminal in chronological order after transmitting multicast frames to each of the terminals.

CITATION LIST

Patent Literature

Patent Literature 1: JP 2009-049704A

DISCLOSURE OF INVENTION

Technical Problem

However, in the invention disclosed in Patent Literature 1, it may be difficult to efficiently utilize wireless communication resources. For example, wireless communication resources for a delivery acknowledgment with respect to multicast frames are chronologically allocated to terminals that are subjects of the delivery acknowledgment. For this reason, it may be difficult to allocate wireless communication resources for other communication until the deliver acknowledgment ends with respect to all of the terminals.

Therefore, the present disclosure proposes novel and improved communication apparatuses and communication methods that enable reinforcement of reliability of multicast communication and effective utilization of wireless communication resources to be compatible.

Solution to Problem

According to the present disclosure, there is provided a communication apparatus including: a communication unit configured to perform communication of a frame. The communication unit transmits a frequency allocation frame, which includes frequency allocation information that specifies a transmission frequency of a delivery acknowledgment response frame with respect to a multicast frame, and receives the delivery acknowledgment response frame that is transmitted in the transmission frequency specified by the frequency allocation information and is frequency-division multiplexed.

In addition, according to the present disclosure, there is provided a communication apparatus including: a communication unit configured to perform communication of a frame. The communication unit receives a frequency allocation frame, which includes frequency allocation information that specifies a transmission frequency of a delivery acknowledgment response frame with respect to a multicast frame, and transmits the delivery acknowledgment response frame using the transmission frequency specified by the frequency allocation information. The delivery acknowledgment response frame is frequency-division multiplexed.

In addition, according to the present disclosure, there is provided a communication method performed by a communication unit, the method including: performing communication of a frame; transmitting a frequency allocation frame, which includes frequency allocation information that specifies a transmission frequency of a delivery acknowledgment response frame with respect to a multicast frame; and receiving the delivery acknowledgment response frame that is transmitted in the transmission frequency specified by the frequency allocation information and is frequency-division multiplexed.

In addition, according to the present disclosure, there is provided a communication method performed by a communication unit, the method including: performing communication of a frame; receiving a frequency allocation frame, which includes frequency allocation information that specifies a transmission frequency of a delivery acknowledgment response frame with respect to a multicast frame; and transmitting the delivery acknowledgment response frame using the transmission frequency specified by the frequency allocation information. The delivery acknowledgment response frame is frequency-division multiplexed.

Advantageous Effects of Invention

According to the present disclosure described above, it is possible to provide a communication apparatus and a communication method that enable reinforcement of reliability of multicast communication and effective utilization of wireless communication resources to be compatible. Note that the above advantageous effects are not necessarily limiting. In addition to or instead of the above advantageous effects, any of the advantageous effects described in the present specification or other advantageous effects apparent from the present specification may be provided.

MODE(S) FOR CARRYING OUT THE INVENTION

Figure 1:
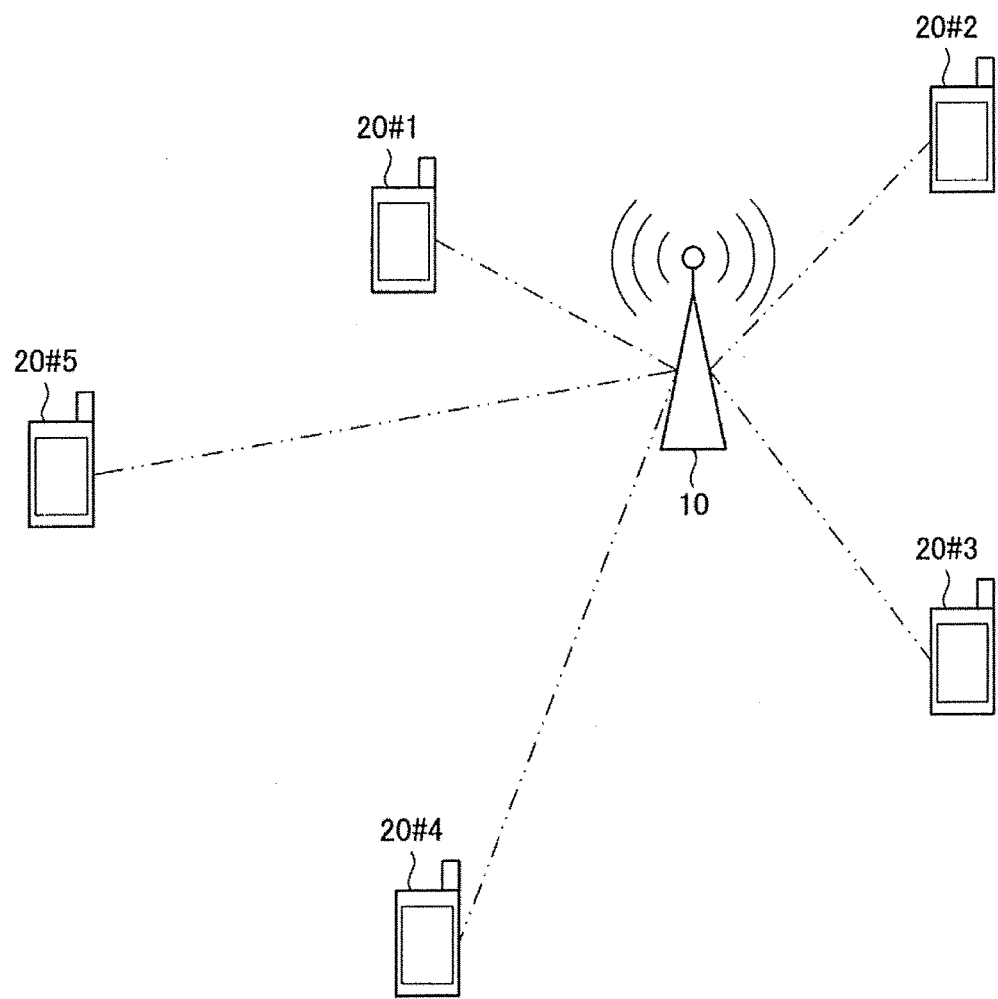
FIG. 1 is a diagram illustrating an example of a configuration of a communication system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, there are cases in which a plurality of components having substantially the same function are distinguished by adding different numbers to the end of the same reference numeral. For example, a plurality of components having substantially the same function are distinguished as necessary like an STA 20#1 and an STA 20#2. However, in a case where it is unnecessary to distinguish components having substantially the same function, only the same reference numeral is added. For example, in a case where it is unnecessary to particularly distinguish an STA 20#1 and an STA 20#2, they are referred to as simply as an "STA 20."

Note that the description will proceed in the following order.
1. Overview of communication apparatus according to embodiment of present disclosure
2. Communication apparatus according to embodiment of present disclosure
2-1. Configurations of apparatuses
2-2. Technical features
2-3. Processes of apparatuses
2-4. Modified example
3. Application examples
4. Conclusion

1. OVERVIEW OF COMMUNICATION SYSTEM ACCORDING TO EMBODIMENT OF PRESENT DISCLOSURE

First, an overview of a communication system related to an embodiment of the present disclosure will be described with reference to FIG. 1. FIG. 1 is a diagram illustrating an example of a configuration of a communication system according to an embodiment of the present disclosure.

The communication system is constituted by a communication apparatus 10 and a plurality of communication apparatuses 20. The communication apparatus 10 and the communication apparatuses 20 each have a wireless communication function. In particular, the communication apparatus 10 has a function of multicast communication for transmitting a frame to one or a plurality of communication apparatuses. In addition, the communication apparatus 10 operates as an access point (which will also be referred to as an AP below) and the communication apparatuses 20 operate as stations (each of which will also be referred to as an STA below). The communication apparatus 10 will also be referred to as an AP 10, and the communication apparatuses 20 will also be referred to as STAs 20. Thus, multicast communication from the AP 10 to the plurality of STAs 20 is possible in the communication system. Note that communication from the AP 10 to the STAs 20 will be referred to as downlink (DL), and communication from the STAs 20 to the AP 10 will be referred to as uplink (UL).

The communication system can be constituted by, for example, the AP 10 and a plurality of STAs 20#1 to 20#4, as illustrated in FIG. 1. The AP 10 and the STAs 20#1 to 20#4 are connected through wireless communication and perform transmission and reception of frames directly to and from each other. For example, the AP 10 is a communication apparatus complying with IEEE 802.11 and transmits multicast frames that are destined for each of the STAs 20#1 to 20#4.

Figure 2:
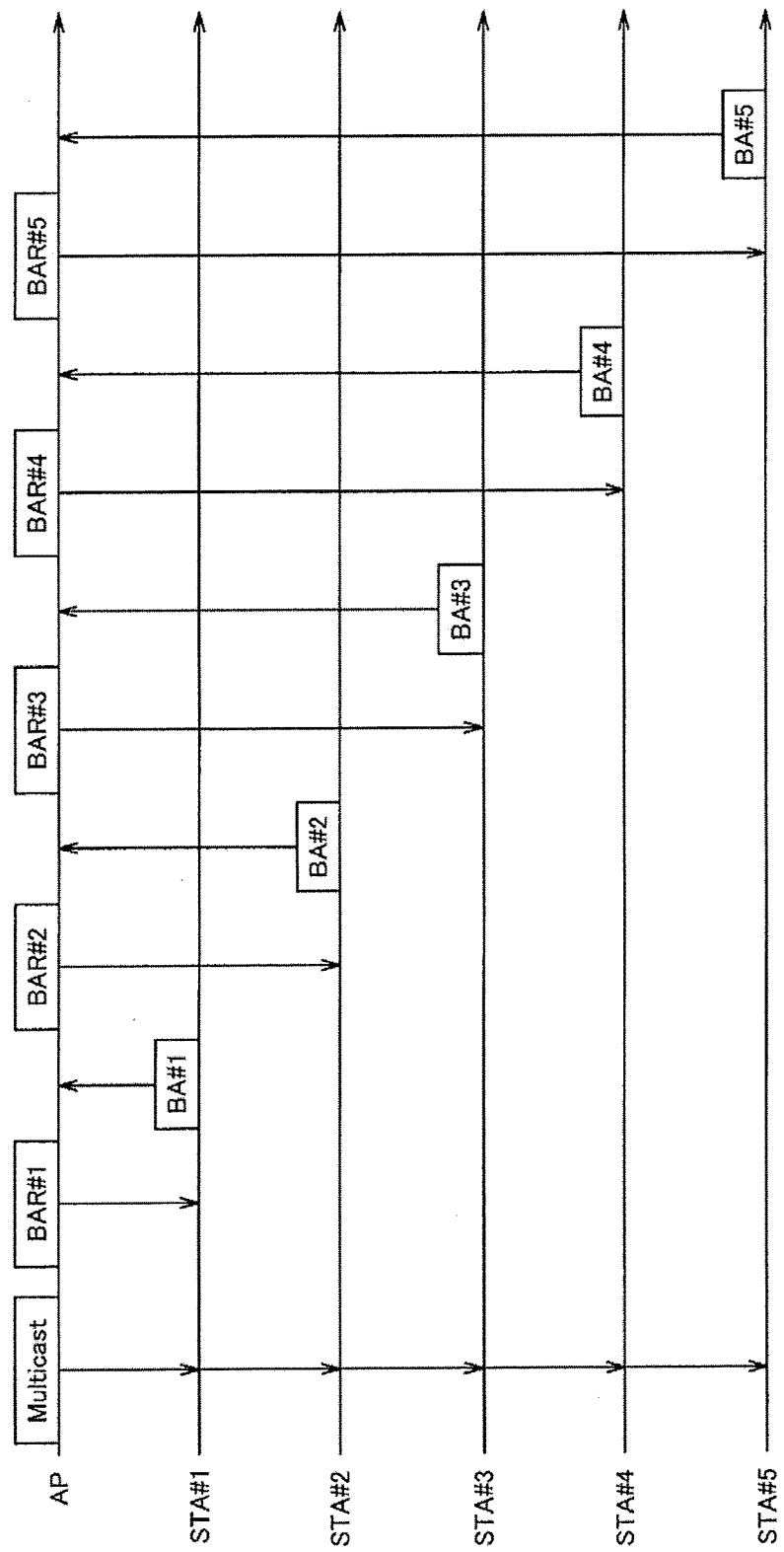
FIG. 2 is a diagram for describing delivery acknowledgment in past multicast communication.

Here, giving delivery acknowledgments with respect to a multicast frame is considered in view of reinforcement of reliability of multicast communication. Specifically, a BAR frame and a BA frame (which will also be referred to as delivery acknowledgment frames below) are exchanged as delivery acknowledgments with respect to a multicast frame after the multicast frame is transmitted. Further, delivery acknowledgments in past multicast communication will be described with reference to FIG. 2. FIG. 2 is a diagram for describing delivery acknowledgments in past multicast communication.

First, the AP transmits a multicast frame to each of the STAs, and then transmits BAR frames to the STAs in chronological order. For example, after transmitting the multicast frame, the AP transmits BAR #1 to #5 frames to the STAs #1 to #5 in chronological order as illustrated in FIG. 2.

Then, when the BAR frames are received, each of the STAs transmits a BA frame to the AP. For example, when the BAR #1 to #5 frames are received, the STAs #1 to #5 respectively transmit BA #1 to #5 frames to the AP.

Figure 3:
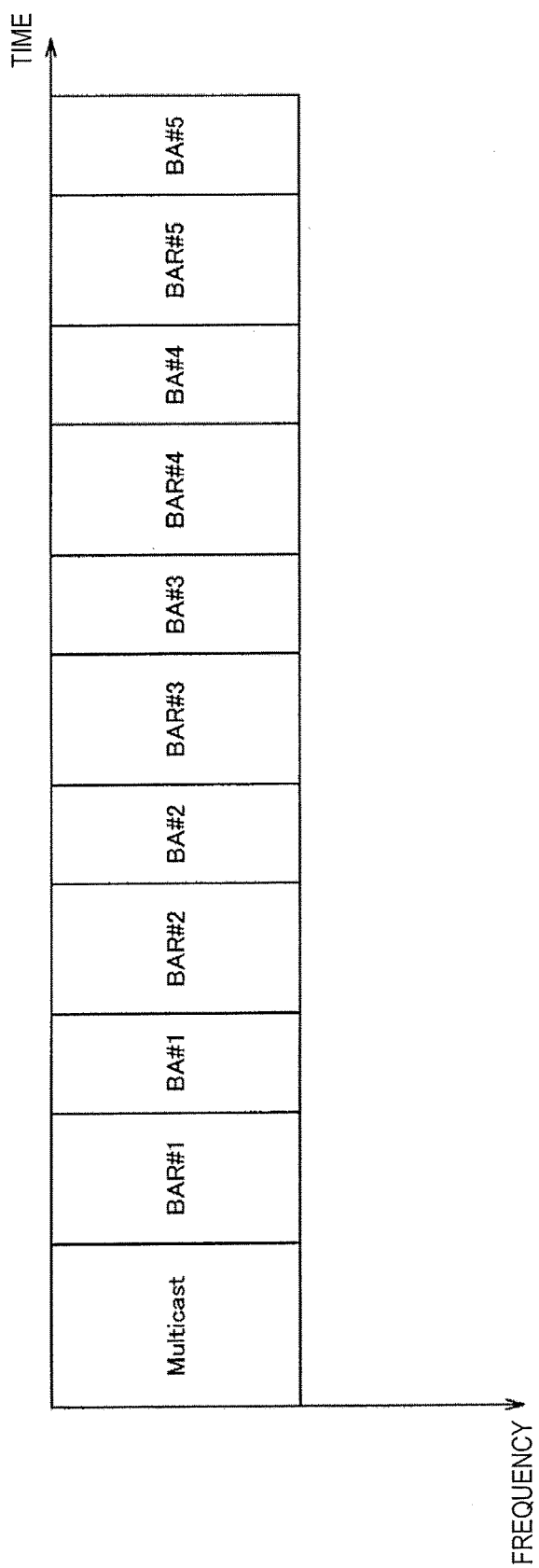
FIG. 3 is a diagram for describing wireless communication resources allocated for delivery acknowledgment in past multicast communication.

In addition, wireless communication resources for giving delivery acknowledgments in past multicast communication are allocated to the STAs, each of which is a subject of a delivery acknowledgment, in chronological order. Wireless communication resources allocated for delivery acknowledgments in past multicast communication will be described with reference to FIG. 3. FIG. 3 is a diagram for describing wireless communication resources allocated for delivery acknowledgments in past multicast communication.

Wireless communication resources for transmitting delivery acknowledgment frames with respect to a multicast frame are chronologically allocated to each of the STAs, which are subjects of delivery acknowledgments. For example, wireless communication resources for transmitting the BAR #1 to #5 frames and the BA #1 to #5 frames (which will also be referred to as delivery acknowledgment #1 to #5 frames below) with respect to the STAs #1 to #5 are allocated in order along a time axis, as illustrated in FIG. 3.

With respect to delivery acknowledgments in past multicast communication, the wireless communication resources for giving delivery acknowledgment are chronologically allocated to each of the STAs. Thus, it may be difficult to allocate the wireless communication resources to other communication until all of the STAs finish giving delivery acknowledgments.

Therefore, the present disclosure proposes communication apparatuses that enable reinforcement of reliability of multicast communication and effective utilization of wireless communication resources to be compatible. Details of the communication apparatuses will be described below. Note that, although the example of the communication system constituted by the AP 10 and the STAs 20 has been described as an example of the communication system in FIG. 1, one of the STAs 20 may be a communication apparatus having a plurality of direct links to the other STAs 20 instead of the AP 10. In this case, the above-described DL can be understood as "simultaneous transmission from one STA to a plurality of STAs" and the above-described UL can be understood as "simultaneous transmission from a plurality of STAs to one STA."

2. COMMUNICATION APPARATUSES ACCORDING TO EMBODIMENT OF PRESENT DISCLOSURE

The overview of the communication system according to the embodiment of the present disclosure has been described above. Next, the AP 10 and the STA 20 according to the embodiment of the present disclosure will be described. Note that an example in which BAR frames and BA frames are exchanged as delivery acknowledgment request frames and delivery acknowledgment response frames will be described below.

2-1. Configurations of Apparatuses

Figure 4:
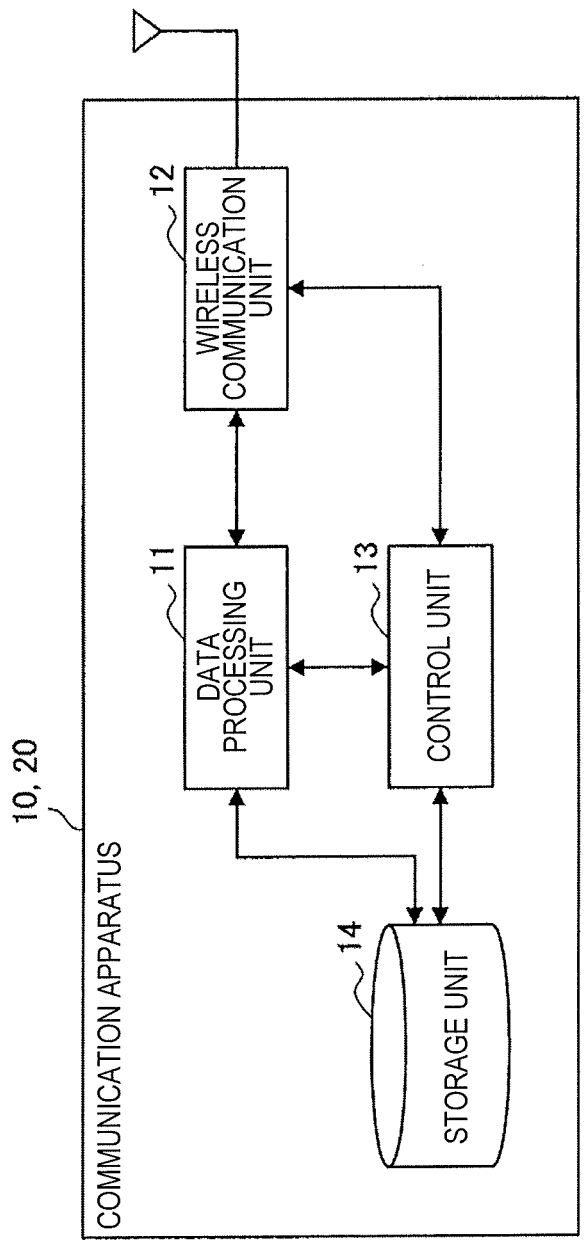
FIG. 4 is a block diagram illustrating an example of a schematic functional configuration of an AP and an STA according to an embodiment of the present disclosure.

First, basic functional configurations of the AP 10 and the STA 20 according to the embodiment of the present disclosure will be described with reference to FIG. 4. FIG. 4 is a block diagram illustrating an example of a schematic functional configuration of the AP 10 and the STA 20 according to the embodiment of the present disclosure.

The AP 10 and the STA 20 each include a data processing unit 11, a wireless communication unit 12, a control unit 13, and a storage unit 14, as illustrated in FIG. 4.

The data processing unit 11 performs a process of transmitting and receiving data as a part of a communication unit. Specifically, the data processing unit 11 generates a frame on the basis of data from a communication upper layer and provides the generated frame to the wireless communication unit 12. The data processing unit 11 generates, for example, a frame (or a packet) from data and performs processing such as adding a MAC header for media access control (MAC), adding an error detection code to the generated frame, and the like. In addition, the data processing unit 11 extracts data from the received frame and provides the extracted data to the communication upper layer. The data processing unit 11 acquires the data by performing, for example, analysis of the MAC header, detection and correction of a code error, reordering, and the like on the received frame.

The wireless communication unit 12 has a signal processing function, a wireless interface function, and the like.

The signal processing function is a function of signal processing such as modulating a frame and the like. Specifically, the wireless communication unit 12 generates a symbol stream by encoding, interleaving, and modulating the frame provided by the data processing unit 11 in accordance with a coding scheme, a modulation scheme, and the like set by the control unit 13. In addition, the wireless communication unit 12 acquires the frame by demodulating, decoding, and the like the symbol stream obtained through the processes of the wireless interface function, and provides the acquired frame to the data processing unit 11 or the control unit 13.

The wireless interface function is a function of transmitting and receiving a signal via an antenna. Specifically, the wireless communication unit 12 converts a signal relating to the symbol stream obtained through the process of the signal processing function into an analog signal, amplifies and filters the signal, and then performs frequency up-conversion thereon. Then, the wireless communication unit 12 transmits the processed signal via the antenna. Further, the wireless communication unit 12 performs processes contrary to those performed for signal transmission, for example, frequency down-conversion, digital signal conversion, and the like, on a signal obtained from the antenna.

The control unit 13 controls overall operations of the AP 10 or the STA 20 as a part of the communication unit. Specifically, the control unit 13 performs processing such as transfer of information between functions, a setting of communication parameters, a scheduling of frames (or packets) for the data processing unit 11, and the like.

The storage unit 14 stores information to be used in processing of the data processing unit 11 or the control unit 13. Specifically, the storage unit 14 stores information to be saved in frames, information acquired from frames, information of communication parameters, and the like.

2-2. Technical Features

Next, technical features of the AP 10 and the STA 20 according to the embodiment of the present disclosure will be described.

((Functions of AP))

First, characteristic functions of the AP 10 will be described.

(Transmission of Multicast Frame)

The AP 10 transmits a multicast frame to the STAs 20. Specifically, the control unit 13 causes the data processing unit 11 to generate a multicast frame destined for one or the plurality of STAs 20, and the wireless communication unit 12 transmits the generated multicast frame. The multicast frame can be, for example, a data frame. Note that the multicast frame may be a control frame or a management frame.

(Determination of Subject of Delivery Acknowledgment)

The AP 10 determines STAs 20 that are subjects of delivery acknowledgments with respect to the multicast frame. Specifically, the control unit 13 determines the number of STAs 20 that will be the subjects of the delivery acknowledgments and selects a number of the STAs 20, which is a number less than or equal to the determined number, as the subjects of the delivery acknowledgment from STAs 20 that are destinations of the multicast frame.

More specifically, the control unit 13 determines the number of STAs 20 that will be the subjects of the delivery acknowledgments on the basis of a degree of congestion of communication. For example, the control unit 13 determines the number of STAs 20 that will be the subjects of the delivery acknowledgments in accordance with an amount of available wireless communication resources. Note that the control unit 13 may determine on the number of STAs 20 that will be the subjects of the delivery acknowledgments on the basis of a predetermined value. The predetermined value is stored in, for example, the storage unit 14.

In addition, the control unit 13 selects the STAs 20 that will be the subjects of the delivery acknowledgments from the STAs 20 that are the destinations of the multicast frame on the basis of a reception characteristic of the STAs 20. The reception characteristic of the STAs 20 is, for example, at least one of a code error rate, a signal-to-noise (SN) ratio, communication throughput, and the number of multicast frames that the STAs 20 successfully receive. Then, the control unit 13 preferentially selects an STA 20, which has a lesser reception characteristic, for example, a lower SN ratio, as the subject of the delivery acknowledgment. In this case, since the STA 20 with a lower degree of communication reliability than the other STAs 20 is selected as the subject of the delivery acknowledgment, it is possible to effectively reinforce reliability of the whole multicast communication.

As described above, the AP 10 determines the number of STAs 20 that will be the subjects of the delivery acknowledgments and selects a number of the STAs 20, which is a number less than or equal to the determined number, as the subjects of the delivery acknowledgments from the STAs 20 that are the destinations of the multicast frame. Thus, tightness in using wireless communication resources for delivery acknowledgments caused by a large number of STAs 20 that are the destinations of the multicast frame is relieved. As a result, it is possible to give delivery acknowledgments with respect to the multicast frame with high efficiency.

(Allocation of Wireless Communication Resources for Delivery Acknowledgment)

Figure 5:
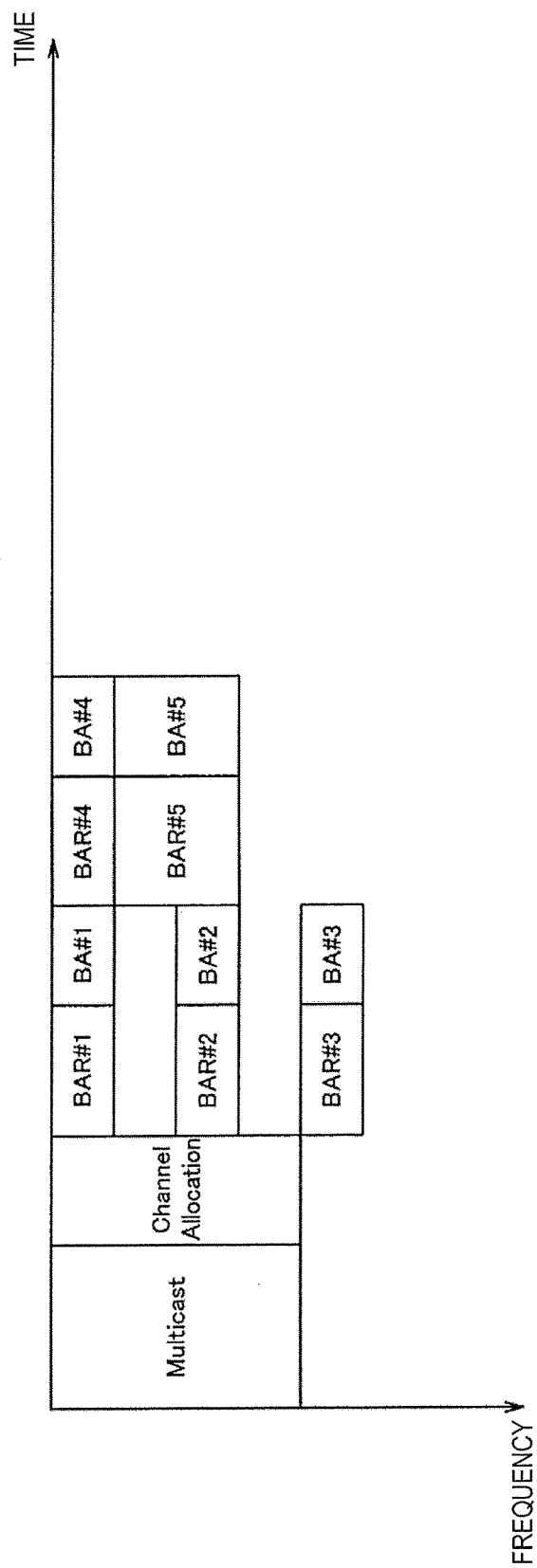
FIG. 5 is a diagram for describing allocation of wireless communication resources of an AP according to the embodiment.

The AP 10 allocates wireless communication resources for delivery acknowledgments to the STAs 20 that are determined to be the subjects of the delivery acknowledgments. Specifically, the control unit 13 determines a center frequency and a bandwidth to be used when giving delivery acknowledgment as a transmission frequency for each of the STAs 20 that are the subjects of the delivery acknowledgments. Further, allocation of wireless communication resources will be described in detail with reference to FIG. 5. FIG. 5 is a diagram for describing allocation of wireless communication resources of the AP 10 according to the present embodiment.

The control unit 13 determines a center frequency, which is allocated to each of the STAs 20 selected as a destination of a BAR frame to be transmitted during the same period, i.e., selected as the subject of the delivery acknowledgment, as a center frequency that is different for each of the STAs 20. For example, although wireless communication resources are allocated to delivery acknowledgment #1 to #3 frames in the same time slot, as illustrated in FIG. 5, center frequencies of each of the allocated wireless communication resources are different. Note that wireless communication resources allocated in different time slots may have the same center frequency.

Here, there is a case where allocation of the wireless communication resources is biased to a specific band depending on a center frequency determination method. In addition, there also is a case where the band to which the allocation of the wireless communication resources is biased is congested. In this case, there is a possibility of communication efficiency of giving delivery acknowledgments deteriorating.

Thus, the AP 10 causes a band used for giving delivery acknowledgments to be distributed to the STAs 20 selected as the subjects of the delivery acknowledgments. Specifically, the control unit 13 determines on a center frequency on the basis of at least one of identification information of a selected STA 20 and time information of the communication apparatus.

For example, the identification information is a connection identifier such as an association identifier (AID), and the time information is a time stamp obtained using a time synchronization function (TSF) or the like (which will also be referred to as TSFv below). Then, the control unit 13 determines the center frequency using the following formula.

[Math. 1]

$$Ch = \text{mod}\,[(TSFv + AID), CH\_NUM] \qquad \text{(Formula 1)}$$

In Formula 1 described above, Ch indicates a channel number, i.e., an index of the center frequency, and CH_NUM indicates the number of available channels for giving delivery acknowledgments. Note that the center frequency is uniquely specified with Ch. In addition, since the TSFv has fine granularity, it is desirable to use a rounded TSFv in a range in which no error occurs in the AP 10 and the STAs 20.

Note that the control unit 13 may determine the allocated center frequency as a center frequency different from that for the multicast frame. For example, center frequencies allocated to the delivery acknowledgment #1 to #4 frames are different from the center frequency allocated to the multicast frame, as illustrated in FIG. 5. The center frequency of wireless communication resources for delivery acknowledgments may certainly be the same as the center frequency allocated to the multicast frame, like a center frequency allocated to the delivery acknowledgment #5 frame.

In addition, the control unit 13 determines a bandwidth allocated to a destination of a BAR frame, i.e., each of the STAs 20 selected as a subject of the delivery acknowledgment, to be a bandwidth that is different for at least some of the STAs 20. Specifically, the control unit 13 determines a bandwidth of a certain STA 20 on the basis of an allocation of a center frequency, which is adjacent to a center frequency allocated to the certain STA 20, for another STA 20.

Here, in IEEE 802.11, it is stipulated that a BAR frame is transmitted in a bandwidth of 20 MHz, i.e., in one channel. Thus, in a case where a bandwidth of two or more channels is available, it is possible to transmit a BAR frame using the bandwidth of the two or more channels. As a result, it would be favorable for a communication apparatus on a reception side, i.e., the STA 20, to successfully receive at least one of a plurality of BAR frames, and thus an effect of diversified frequencies can be gained and communication reliability with respect to delivery acknowledgments can be reinforced.

For example, since the center frequency, which is adjacent to the center frequency of the delivery acknowledgment #5 frame, is not allocated to other STAs 20, in other words, the delivery acknowledgments are not given to the other STAs 20 using the adjacent center frequency, as illustrated FIG. 5, a wider bandwidth than bandwidths of the delivery acknowledgment #1 to #4 frames is allocated to the delivery acknowledgment #5 frame. Note that the same bandwidth may certainly be allocated to each of the STAs 20. For example, the same bandwidth may be allocated to the delivery acknowledgment #1 to #4 frames.

Note that, even in a case where an adjacent center frequency is not allocated to the other STAs 20, the bandwidth may not necessarily be widened. For example, although center frequencies adjacent to the center frequencies of the delivery acknowledgment #1 to #3 frames are vacant, as illustrated in FIG. 5, the bandwidths of the delivery acknowledgment #1 to #3 are not widened.

In addition, another condition may be used to determine a bandwidth as well as whether to allocate an adjacent center frequency to the other STAs 20. For example, the control unit 13 determines a bandwidth on the basis of whether an adjacent center frequency is allocated to the other STA 20s and a reception characteristic of the STAs 20.

In addition, the control unit 13 may determine a bandwidth that is used to transmit delivery acknowledgment response frames in the same period to be a bandwidth that is different from a bandwidth of a multicast frame. For example, the sum of bandwidths allocated to the delivery acknowledgment #1 to #3 frames transmitted in the same period is narrower than the bandwidth of the multicast frame, as illustrated in FIG. 5. In addition, the sum of the bandwidths allocated to the delivery acknowledgment frames may be the same as, or wider than, the bandwidth allocated to the multicast frame. Note that the control unit 13 may determine a bandwidth allocated to the STAs 20 to be a bandwidth that is different from the bandwidth of the multicast frame. For example, the bandwidth allocated to each of the delivery acknowledgment #1 to #4 frames is narrower than the bandwidth allocated to the multicast frame, as illustrated in FIG. 5. Of course, a bandwidth of wireless communication resources for delivery acknowledgments may be the same as, or wider than the bandwidth of the multicast frame.

Furthermore, the delivery acknowledgment frames may be received by performing time-division multiplexing on the basis of the number of transmission destinations of the delivery acknowledgment request frames. Specifically, in a case in which the number of transmission destinations of BAR frames is greater than or equal to a predetermined number, the control unit 13 allocates a transmission period in addition to a center frequency and a bandwidth of each of the STAs 20 that are the subjects of the delivery acknowledgments. For example, the control unit 13 allocates the delivery acknowledgment #1 to #3 frames to a transmission period that comes after transmission of a CA frame and allocates the delivery acknowledgment #4 and #5 frames to the next transmission period that comes after the transmission period of the delivery acknowledgment #1 to #3 frames, as illustrated in FIG. 5.

(Transmission of CA Frame)

Figure 6:
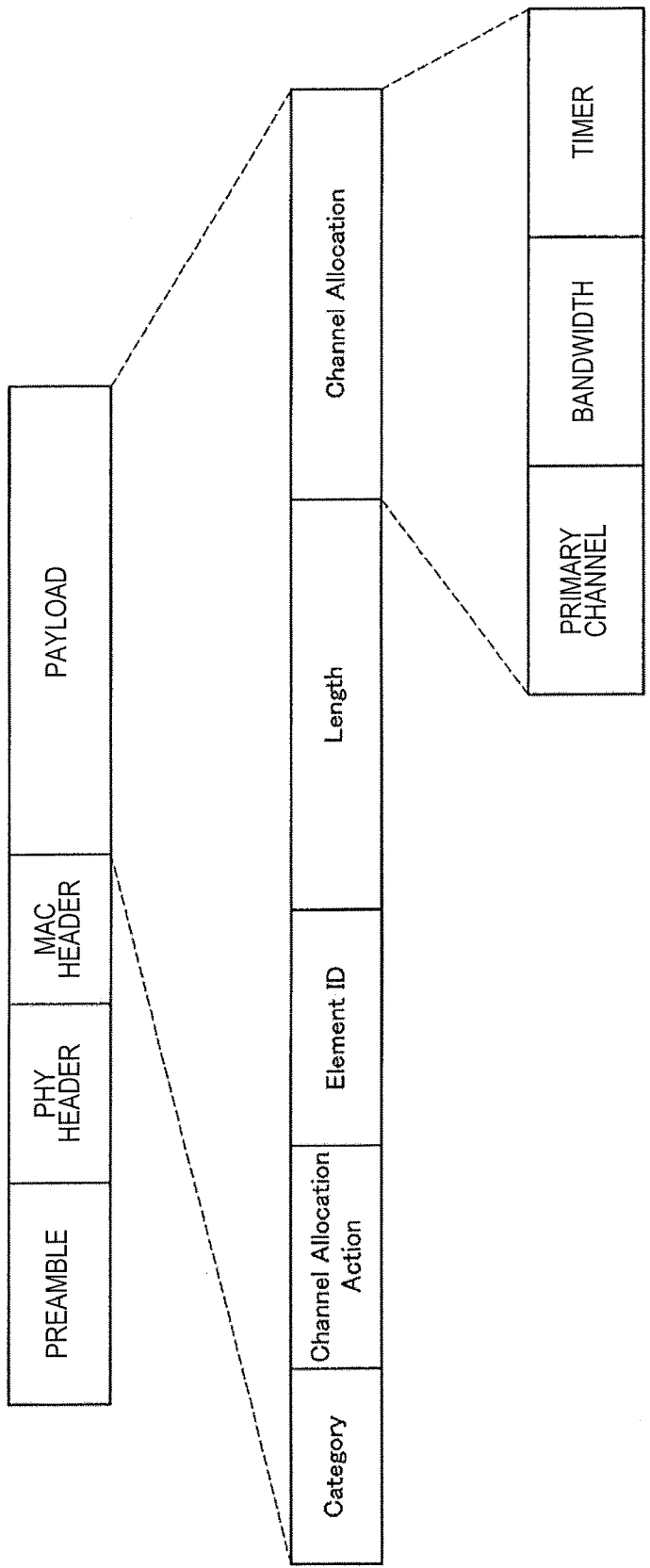
FIG. 6 is a diagram illustrating an example of a configuration of a CA frame transmitted by the AP according to the embodiment.

The AP 10 transmits a frame of wireless communication resources to be allocated for delivery acknowledgments (which will also be referred to as a channel allocation (CA) frame below) to each of the STAs 20 selected as a subject of a delivery acknowledgment. Specifically, the control unit 13 causes the data processing unit 11 to generate a CA frame including information that specifies a transmission frequency of a BA frame with respect to a multicast frame as a frequency allocation frame (which will also be referred to as frequency allocation information). Then, the wireless communication unit 12 transmits the generated CA frame. The CA frame is transmitted, for example, as a multicast frame destined for each of the STAs 20 selected as the subject of a delivery acknowledgment before an exchange of the delivery acknowledgment frames each time a delivery acknowledgment is given. Further, the CA frame will be described in detail with reference to FIG. 6. FIG. 6 is a diagram illustrating an example of a configuration of a CA frame transmitted by the AP 10 according to the present embodiment.

First, an overall configuration of the CA frame will be described. The CA frame includes, for example, a preamble, a physical layer (PHY) header, a MAC header, and a payload, as illustrated at the top of FIG. 6. Note that characteristic information of the CA frame is included in the payload.

Next, the payload of the CA frame will be described. The payload of the CA frame includes, for example, Category, Action, Element ID, Length, and Channel Allocation fields, as illustrated in the middle portion of FIG. 6. Note that the Action field stores Channel Allocation Action.

Further, the Channel Allocation field will be described. The Channel Allocation field includes, for example, Primary Channel, Bandwidth, and Timer fields as illustrated in the bottom of FIG. 6.

The Primary Channel field stores information that specifies a center frequency of transmission frequencies of delivery acknowledgment frames as frequency allocation information (which will also be referred to as primary channel information below). For example, the Primary Channel information is information indicating an individual center frequency determined for each of the STAs 20.

Note that the Primary Channel information may be information of a calculation formula for computing a center frequency instead of being information indicating the center frequency of each of the STAs 20. The Primary Channel information includes, for example, information indicating Formula 1, information indicating a TSFv of Formula 1, and information indicating CH_NUM. Further, in a case where the STA 20 with respect to Formula 1 and CH_NUM is known, the Primary Channel information may only be the information indicating the TSFv. In this case, the STA 20 computes a bandwidth thereof by applying an AID thereof and the TSFv included in the Primary Channel information to Formula 1.

Accordingly, the amount of data of the CA frame is more reduced than a case where Primary Channel information of each of the STAs 20 is stored, and thus wireless communication resources can be effectively utilized.

The Bandwidth field stores information that specifies bandwidths of transmission frequencies of the delivery acknowledgment frames (which will also be referred to as bandwidth information below) as frequency allocation information. The bandwidth information is, for example, information indicating individual bandwidths determined for the STAs 20.

Note that the bandwidth information may be information indicating a maximum bandwidth and a minimum bandwidth among bandwidths to be allocated to the selected STA 20 instead of information indicating a bandwidth of each of the STAs 20. For example, the STA 20 stands by for reception of a BAR frame in the maximum bandwidth stored in the bandwidth information and transmits a BA frame using a bandwidth between the minimum bandwidth and the maximum bandwidth stored in the bandwidth information. In this case, the amount of data of the CA frame is more reduced than a case where the bandwidth information of each of the STAs 20 is stored, and thus wireless communication resources can be effectively utilized.

The Timer field stores information that specifies a period in which a communication frequency is to be set to an allocated center frequency and bandwidth (which will also be referred to as timer information below) as setting period information. Specifically, the timer information is information indicating a time at which a center frequency and a bandwidth, which is a communication frequency of a communication apparatus, allocated for delivery acknowledgments are set back to an original center frequency and bandwidth. Note that the original center frequency and bandwidth are a center frequency and a bandwidth in which a multicast frame is successfully received. The timer information stores, for example, information indicating a time estimated to be required for giving a delivery acknowledgment. In addition, the time indicated by the timer information may be a time shared by the AP 10 and the STA 20, for example, a time obtained using a TSF or the like, or a time that elapses from a reception of the CA frame. Note that the time indicated by the timer information can be set to have a length in consideration of a failure when communicating a delivery acknowledgment frame.

(Communication of Delivery Acknowledgment)

The AP 10 performs communication of a delivery acknowledgment with respect to a multicast frame with each of the STAs 20 that is a destination of a BAR frame after transmitting the CA frame. Specifically, the control unit 13 causes the data processing unit 11 to generate the BAR frame with respect to the multicast frame. Then, the wireless communication unit 12 transmits the generated BAR frame using a transmission frequency specified by the frequency allocation information that the STA 20 is notified of using the CA frame. For example, the wireless communication unit 12 transmits a BAR frame group that has undergone frequency division multiplexing with respect to each of the STAs 20 in the center frequency and bandwidth allocated to each of the STAs 20 to each of the STAs 20. Note that a Group Cast with Retry BAR (GCR BAR) stipulated in IEEE 802.11 may be used or a normal BAR may be used as the BAR frame.

In addition, the wireless communication unit 12 receives a BA frame that is transmitted using the transmission frequency specified by the frequency allocation information that the STA 20 is notified of using the CA frame and is frequency-division multiplexed. The wireless communication unit 12 receives a BA frame group that has undergone the frequency division multiplexing as a response to the BAR frame, for example, after the BAR frame is transmitted, and acquires the BA frame of each of the STAs 20 from the BA frame group on the basis of the center frequency and bandwidth that the STA 20 is notified of using the CA frame.

((Functions of STA))

Next, characteristic functions of each of the STAs 20 will be described.

(Reception of Multicast Frame)

Each of the STAs 20 receives a multicast frame from the AP 10. Note that the control unit 13 sets in advance a communication frequency of the communication apparatus to a center frequency and a bandwidth in which the multicast frame is successfully received.

(Reception of CA Frame)

The STA 20 receives a CA frame from the AP 10. Specifically, the wireless communication unit 12 receives the CA frame from the AP 10 after the multicast frame is received. Note that primary channel information, bandwidth information, and timer information are acquired from the CA frame when the CA frame is received.

(Setting of Communication Frequency)

When the CA frame is received, the STA 20 sets a communication frequency of the communication apparatus to a communication frequency for giving delivery acknowledgment. Specifically, the control unit 13 sets the communication frequency of the communication apparatus to a transmission frequency specified by frequency allocation information included in the received CA frame. The control unit 13 sets the communication frequency of the communication apparatus to, for example, a center frequency and a bandwidth respectively specified by the primary channel information and the bandwidth information included in the CA frame.

Note that, in a case where the CA frame includes only information for computing a center frequency and a bandwidth as described above, the control unit 13 computes the center frequency and the bandwidth on the basis of the primary channel information and the bandwidth information.

In addition, the STA 20 sets a timer for switching the communication frequency. Specifically, the control unit 13 sets the communication frequency of the communication apparatus back to the communication frequency before the setting after a period specified by timer information included in the CA frame elapses. For example, when a time indicated by the timer information arrives or a time indicated by the timer information elapses from the reception of the CA frame, the control unit 13 sets the communication frequency of the communication apparatus from the communication frequency set for giving a delivery acknowledgment back to the communication frequency for receiving a multicast frame.

(Communication for Delivery Acknowledgment)

The STA 20 performs communication for giving a delivery acknowledgment with respect to a multicast frame after receiving a CA frame. Specifically, the wireless communication unit 12 receives a BAR frame that was transmitted in the transmission frequency specified by the frequency allocation information included in the CA frame and was frequency-division multiplexed. For example, the wireless communication unit 12 receives a BAR frame group that has undergone frequency division multiplexing and acquires the BAR frame destined for the apparatus from the BAR frame group on the basis of a center frequency and bandwidth that the communication apparatus is notified of using the CA frame.

In addition, the wireless communication unit 12 transmits a BA frame using the transmission frequency specified by the frequency allocation information included in the CA frame after receiving the BAR frame. For example, the control unit 13 causes the data processing unit 11 to generate the BA frame as a response to the BAR frame. Then, the wireless communication unit 12 transmits the generated BA frame to the AP 10 using the set center frequency and bandwidth. Note that, the BA frame transmitted from the STA 20 is frequency-division multiplexed as a result, and the AP 10 receives the frequency-division multiplexed BA frame group.

2-3. Processes of Apparatuses

Next, processes of the AP 10 and the STA 20 according to the present embodiment will be described.

(Process of AP)

Figure 7:
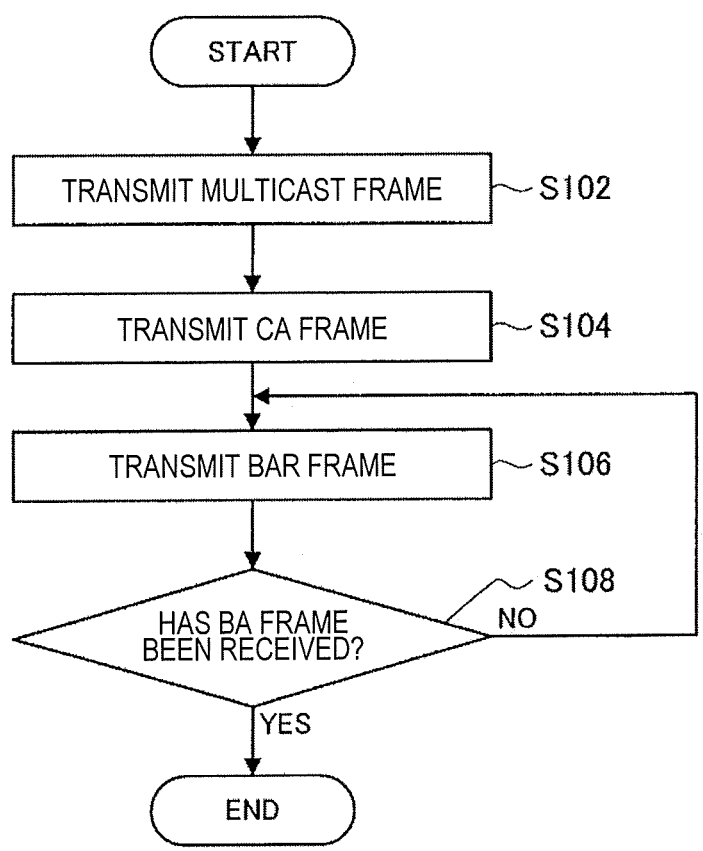
FIG. 7 is a flowchart conceptually illustrating a process of the AP according to the present embodiment.

First, the process of the AP 10 according to the present embodiment will be described with reference to FIG. 7. FIG. 7 is a flowchart conceptually illustrating the process of the AP 10 according to the present embodiment.

The AP 10 transmits a multicast frame to each of the STAs 20 (Step S102). Specifically, the control unit 13 causes the data processing unit 11 to generate a multicast frame destined for each of the STAs 20. Then, the wireless communication unit 12 transmits the generated multicast frame.

Next, the AP 10 transmits a CA frame to each of STAs 20 that are subjects of delivery acknowledgments (Step S104). Specifically, the control unit 13 causes the data processing unit 11 to generate a CA frame including frequency allocation information destined for each of the STAs 20 that are the subjects of the delivery acknowledgments. Then, the wireless communication unit 12 transmits the generated CA frame before a BAR frame is transmitted. Note that the CA frame may be aggregated with the multicast frame. Furthermore, a destination of the CA frame may be a group address used in the multicast frame.

Next, the AP 10 transmits a BAR frame to each of the STAs 20 that are the subjects of the delivery acknowledgments (Step S106). Specifically, the control unit 13 causes the data processing unit 11 to generate the BAR frame for each of the STAs 20 that are subjects of the delivery acknowledgments after transmitting of the CA frame. Then, the wireless communication unit 12 transmits the BAR frame to each of the STAs 20 using a center frequency and a bandwidth allocated to each of the STAs 20.

Next, the AP 10 determines whether the BA frame has been received (Step S108). Specifically, the control unit 13 determines whether the BA frame, which is a response to the BAR frame, has been received from each of the STAs 20 after the BAR frame is transmitted. Then, in a case where the BA frame is determined not to have been received, the control unit 13 causes the wireless communication unit 12 to transmit the BAR frame again with respect to the BA frame that was not received. Note that, when a time to set back a communication frequency of the STAs 20 specified by timer information is determined to have arrived, the control unit 13 ends a standby status for receiving frames using the center frequency and the bandwidth allocated to each of the STAs 20.

(Process of STA)

Figure 8:
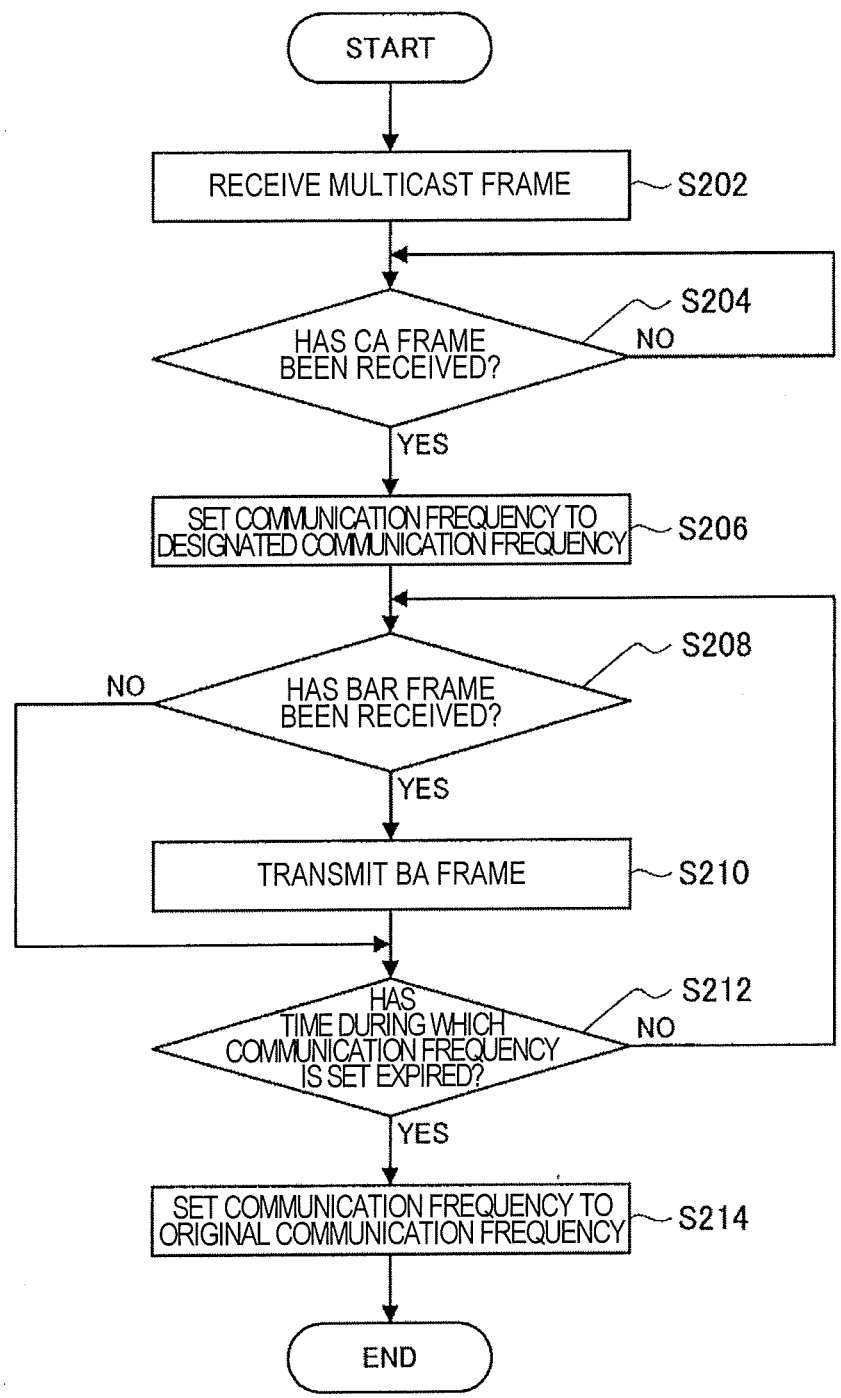
FIG. 8 is a flowchart conceptually illustrating a process of the STA according to the present embodiment.

Next, a process of each STA 20 according to the present embodiment will be described with reference to FIG. 8. FIG. 8 is a flowchart conceptually illustrating the process of each of the STAs 20 according to the present embodiment.

The STA 20 receives the multicast frame from the AP 10 (Step S202). Specifically, the wireless communication unit 12 receives the multicast frame from the AP 10.

Next, the STA 20 receives the CA frame from the AP 10 (Step S204). Specifically, the wireless communication unit 12 receives the CA frame after the multicast frame is received. Note that the wireless communication unit 12 may receive a frame in which the multicast frame and the CA frame are aggregated.

When the CA frame is received, the STA 20 sets a communication frequency of the communication apparatus to a designated communication frequency (Step S206). Specifically, the control unit 13 sets the communication frequency of the communication apparatus on the basis of primary channel information and bandwidth information included in the received CA frame. In addition, the control unit 13 sets a time to set a communication frequency back to the communication frequency on the basis of timer information included in the received CA frame.

Next, the STA 20 receives the BAR frame from the AP 10 (Step S208). Specifically, the wireless communication unit 12 receives the BAR frame destined for the communication apparatus from the frequency-division multiplexed BAR frame group that is transmitted from the AP 10, i.e., transmitted in the center frequency and the bandwidth allocated to the communication apparatus after the CA frame is received.

When the BAR frame is received, the STA 20 transmits a BA frame to the AP 10 (Step S210). Specifically, when the BAR frame destined for the communication apparatus is received, the control unit 13 causes the data processing unit 11 to generate the BA frame that is a response to the BAR frame. Then, the wireless communication unit 12 transmits the generated BA frame in the set communication frequency.

Next, the STA 20 determines whether a time during which the communication frequency is set has expired (Step S212). Specifically, the control unit 13 determines whether a time to set the communication frequency back to the pre-set communication frequency has arrived.

In the case where the time during which the communication frequency is set is determined to have expired, the STA 20 sets the communication frequency of the communication apparatus to an original communication frequency thereof (Step S214). Specifically, when the time to set the communication frequency back to the original communication frequency is determined to have arrived, the control unit 13 sets the communication frequency of the communication apparatus back to the communication frequency for the multicast frame.

According to an embodiment of the present disclosure, the AP 10 transmits the CA frame including the frequency allocation information that specifies the transmission frequency of a delivery acknowledgment response frame with respect to the multicast frame and receives the delivery acknowledgment response frame that was transmitted in the transmission frequency specified by the frequency allocation information and was frequency-division multiplexed as described above. In addition, the STA 20 receives the CA frame and transmits the delivery acknowledgment response frame using the transmission frequency specified by the frequency allocation information. Thus, by giving the delivery acknowledgment with respect to the multicast frame through frequency division multiplexing communication, wireless communication resources can be more effectively utilized while reliability of multicast communication is reinforced in comparison to a case where a delivery acknowledgment is given through time division multiplexing communication.

In addition, the AP 10 transmits the delivery acknowledgment request frame with respect to the delivery acknowledgment response frame using the transmission frequency specified by the frequency allocation information. In addition, the STA 20 sets the communication frequency of the communication apparatus to the transmission frequency specified by the frequency allocation information. Then, the STA 20 receives the delivery acknowledgment request frame with respect to the delivery acknowledgment response frame that was transmitted in the transmission frequency specified by the frequency allocation information and was frequency-division multiplexed. Thus, by performing frequency division multiplexing on the BAR frame, wireless communication resources can be more effectively utilized.

In addition, the frequency allocation information includes information that specifies a center frequency of the transmission frequency. Thus, since the STA 20 is notified of the center frequency using the frame, the AP 10 can dynamically allocate the center frequency so that a delivery acknowledgment appropriate for a communication environment or a state of the STA 20 can be given.

In addition, center frequencies are different between destinations of the delivery acknowledgment request frame transmitted in the same period. For this reason, a collision of the frames or interference with signals with respect to the delivery acknowledgments given using the center frequencies can be avoided, and thus communication of the delivery acknowledgments can be efficient.

In addition, the center frequency is specified on the basis of at least one of identification information of a destination of the delivery acknowledgment request frame and time information of a communication apparatus. Thus, it is possible to suppress biased allocation of the band in which the center frequency is congested.

In addition, the frequency allocation information includes information that specifies a bandwidth of the transmission frequency. Thus, since the STA 20 is notified of the bandwidth using a frame, the AP 10 can dynamically allocate the bandwidth so that delivery acknowledgment appropriate for a communication environment or a state of the STA 20 can be given.

In addition, the bandwidths are different between at least some of the destinations of the delivery acknowledgment request frame. Thus, by allocating appropriate bandwidths to the STAs 20, the bandwidths for delivery acknowledgments of the STAs 20 can be effectively used, and thus communication efficiency can be improved.

In addition, the center frequency is different from the center frequency of the multicast frame. Furthermore, the bandwidth used to transmit the delivery acknowledgment response frame in the same period is different from the bandwidth of the multicast frame. Thus, a degree of freedom for allocating wireless communication resources for delivery acknowledgments increases, and thus efficiency in giving the delivery acknowledgments can be improved.

In addition, the CA frame includes setting period information that specifies a period in which the transmission frequency specified by the frequency allocation information is to be set to the communication frequency. Furthermore, the CA frame includes the setting period information that specifies the period in which the communication frequency is to be set as the transmission frequency specified by the frequency allocation information, and the STA 20 sets the communication frequency of the communication apparatus back to the communication frequency before the setting after the period specified by the setting period information elapses. Thus, it is possible to receive a frame such as a multicast frame transmitted in the original communication frequency after the giving of a delivery acknowledgment is completed.

In addition, the AP 10 transmits the CA frame before transmitting the delivery acknowledgment request frame with respect to the delivery acknowledgment response frame. Thus, by setting the communication frequency before transmitting the BAR frame, the STA 20 can receive the BAR frame and a decrease in communication efficiency caused by reception failure can be prevented.

In addition, when the CA frame is received, the STA 20 sets the communication frequency. Thus, in a case where the BAR frame is transmitted after the CA frame, the communication frequency can be set before the BAR frame is transmitted and it is possible to lower a possibility of failure when receiving the BAR frame.

In addition, the delivery acknowledgment request frame is additionally time-division multiplexed on the basis of a degree of congestion of the transmission frequency. Here, frequency resources for giving delivery acknowledgments are decreased when the number of STAs 20 that are multicast communication targets increases, and thus the number of STAs 20 that fail to give a delivery acknowledgment may increase. However, according to the present configuration, since time-division multiplexing is used in addition to frequency-division multiplexing, additional wireless communication resources for giving delivery acknowledgment are secured, and thus deterioration of reliability in multicast communication can be suppressed.

2-4. Modified Example

The embodiment of the present disclosure has been described above. Note that the present embodiment is not limited to the above examples. A modified example of the present embodiment will be described below.

As the modified example of the present embodiment, the AP 10 may transmit a CA frame during a communication connection with the STA 20, instead of transmitting the CA frame when a delivery acknowledgment is given. Specifically, the control unit 13 transmits the CA frame when a new communication connection with the STA 20 is established. For example, the CA frame may be transmitted each time a new communication connection with the STA 20 is established or at a predetermined time interval. Note that the predetermined time interval may be determined on the basis of a time that elapses from a new additional connection.

Note that the CA frame may be transmitted only to the STA 20 with which the communication connection is established. For example, the AP 10 may transmit the CA frame to the STA 20 with which the connection is established each time a new communication connection with the STA 20 is established. Alternatively, the AP 10 may transmit the CA frame in the multicast scheme in which each of the STAs 20 with which a connection is established within a predetermined period of time is a destination.

In addition, content of the CA frame may be included in a frame that is used for the connection. For example, primary channel information, bandwidth information, and timer information can be included in an Association Response frame.

In addition, as the present modified example, the AP 10 sets a time indicated by the timer information each time a new communication connection with the STAs 20 is established. For example, when a new communication connection with the STAs 20 is established, the control unit 13 sets the timer information on the basis of the number of STAs 20 that are connection destinations of a multicast frame. Then, the CA frame including the set timer information is transmitted to the STAs 20 with which the connection is established.

In addition, the first embodiment has described that the STAs 20 set communication frequencies on the basis of the frequency allocation information included in the CA frame when the CA frame is received. In the present modified example, however, there are cases in which no CA frame is transmitted after the STAs 20 receive a multicast frame.

Thus, the STAs 20 according to the modified example set communication frequencies on the basis of information included in the multicast frame. Specifically, the control unit 13 sets a communication frequency on the basis of information regarding a start of a delivery acknowledgment period. Here, the delivery acknowledgment period refers to a period in which a delivery acknowledgment with respect to the multicast frame is given. More specifically, the control unit 13 sets a communication frequency on the basis of information that specifies a tail of a frame and is included in a multicast frame (which will also be referred to as tail information below). The tail information included in the multicast frame can be, for example, More Fragment (MF) included in a MAC header of the frame. In a case where a value of MF is 0, the control unit 13 sets a communication frequency for transmission and reception of a delivery acknowledgment frame.

Note that a vacant CA frame may be transmitted by the AP 10 before a delivery acknowledgment is given. For example, when the AP 10 transmits a vacant CA frame and the STAs 20 receive the vacant CA frame after transmitting a multicast frame, a communication frequency for giving delivery acknowledgments can be set.

As described above, the AP 10 transmits the CA frame when a communication connection with a destination of a delivery acknowledgment request frame is established according to the modified example of the present embodiment. Thus, no CA frame is transmitted each time a delivery acknowledgment is given, thus the number of operations in which the CA frame is transmitted decreases, and thus wireless communication resources can be more effectively utilized.

In addition, the STA 20 sets the communication frequency of the communication apparatus on the basis of information that specifies a tail of the frame and is included in the received multicast frame. Thus, even in a case where no CA frame is transmitted immediately before the delivery acknowledgment is given, the communication frequency is set at a timing that matches that of the delivery acknowledgment, and thus a failure to communicate a delivery acknowledgment can be suppressed.

3. APPLICATION EXAMPLES

The technology according to the embodiments of the disclosure can be applied to various products. For example, the communication apparatus 20, that is the STA 20, may be realized as mobile terminals such as smartphones, tablet PCs (Personal Computers), notebook PCs, portable game terminals, or digital cameras, fixed-type terminals such as television receivers, printers, digital scanners, or network storages, or car-mounted terminals such as car navigation devices. In addition, the STA 20 may be realized as terminals that perform M2M (Machine to Machine) communication (also referred to as MTC (Machine Type Communication) terminals) such as smart meters, vending machines, remotely controlled surveillance devices, or POS (Point Of Sale) terminals. Furthermore, the STA 20 may be wireless communication modules mounted in such terminals (for example, integrated circuit modules configured by one die).

On the other hand, for example, the communication apparatus 10, that is the AP 10, may be realized as a wireless LAN access point (also referred to as a wireless base station) which has a router function or does not have a router function. In addition, the AP 10 may be realized as a mobile wireless LAN router. Furthermore, the AP 10 may also be a wireless communication module (for example, an integrated circuit module configured with one die) mounted on the device.

3-1. First Application Example

Figure 9:
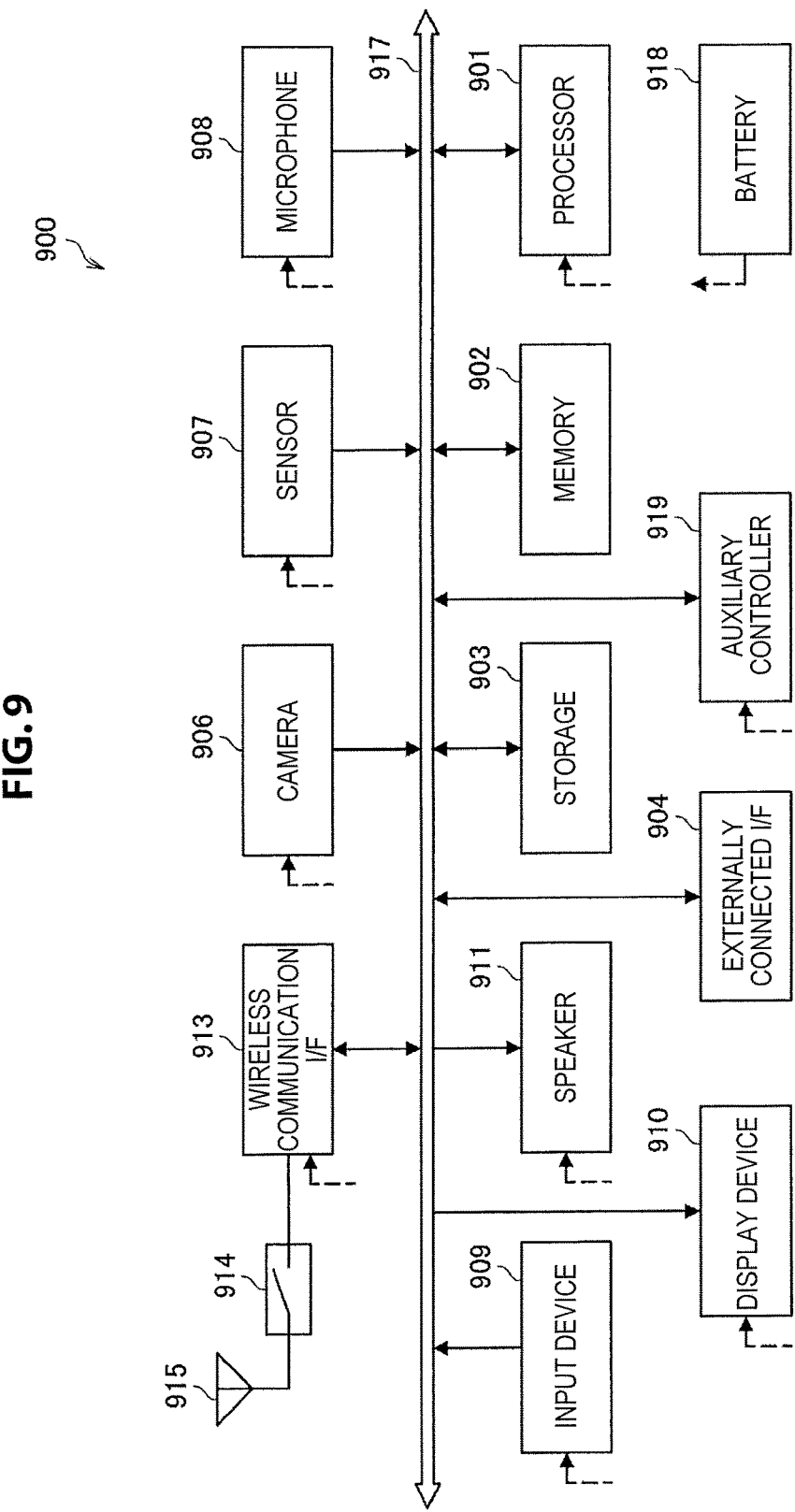
FIG. 9 is a block diagram illustrating an example of a schematic configuration of a smartphone.

FIG. 9 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a CPU (Central Processing Unit) or an SoC (System on Chip), and controls functions of an application layer and other layers of the smartphone 900. The memory 902 includes a RAM (Random Access Memory) and a ROM (Read Only Memory), and stores programs executed by the processor 901 and data. The storage 903 can include a storage medium such as a semiconductor memory or a hard disk. The externally connected interface 904 is an interface for connecting an externally attached device such as a memory card or a USB (Universal Serial Bus) device to the smartphone 900.

The camera 906 has an image sensor, for example, a CCD (Charge Coupled Device) or a CMOS (Complementary Metal Oxide Semiconductor), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad, to execute the wireless LAN communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Wi-Fi Direct is different from the ad hoc mode, and thus one of two terminals operates as an access point. However, communication is performed directly between the terminals. The wireless communication interface 913 can typically include a baseband processor, an RF (Radio Frequency) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 9. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 9 via power supply lines partially indicated by dashed lines in the drawing. The auxiliary controller 919 causes, for example, necessary minimum functions of the smartphone 900 to be operated in a sleep mode.

In the smartphone 900 illustrated in FIG. 9, the data processing unit 11, the wireless communication unit 12, the control unit 13, and the storage unit 14 described using FIG. 4 may be implemented by the wireless communication interface 913. In addition, at least some of the functions may be implemented by the processor 901 or the auxiliary controller 919. For example, when the control unit 13 sets a communication frequency on the basis of frequency allocation information included in a received CA frame, a delivery acknowledgment frame can be transmitted and received using frequency division multiple access in multicast communication. Accordingly, reinforcement of reliability of a multicast frame and effective utilization of wireless communication resources can be compatible.

Note that the smartphone 900 may operate as a wireless access point (software AP) as the processor 901 executes the function of an access point at an application level. In addition, the wireless communication interface 913 may have the function of a wireless access point.

3-2. Second Application Example

Figure 10:
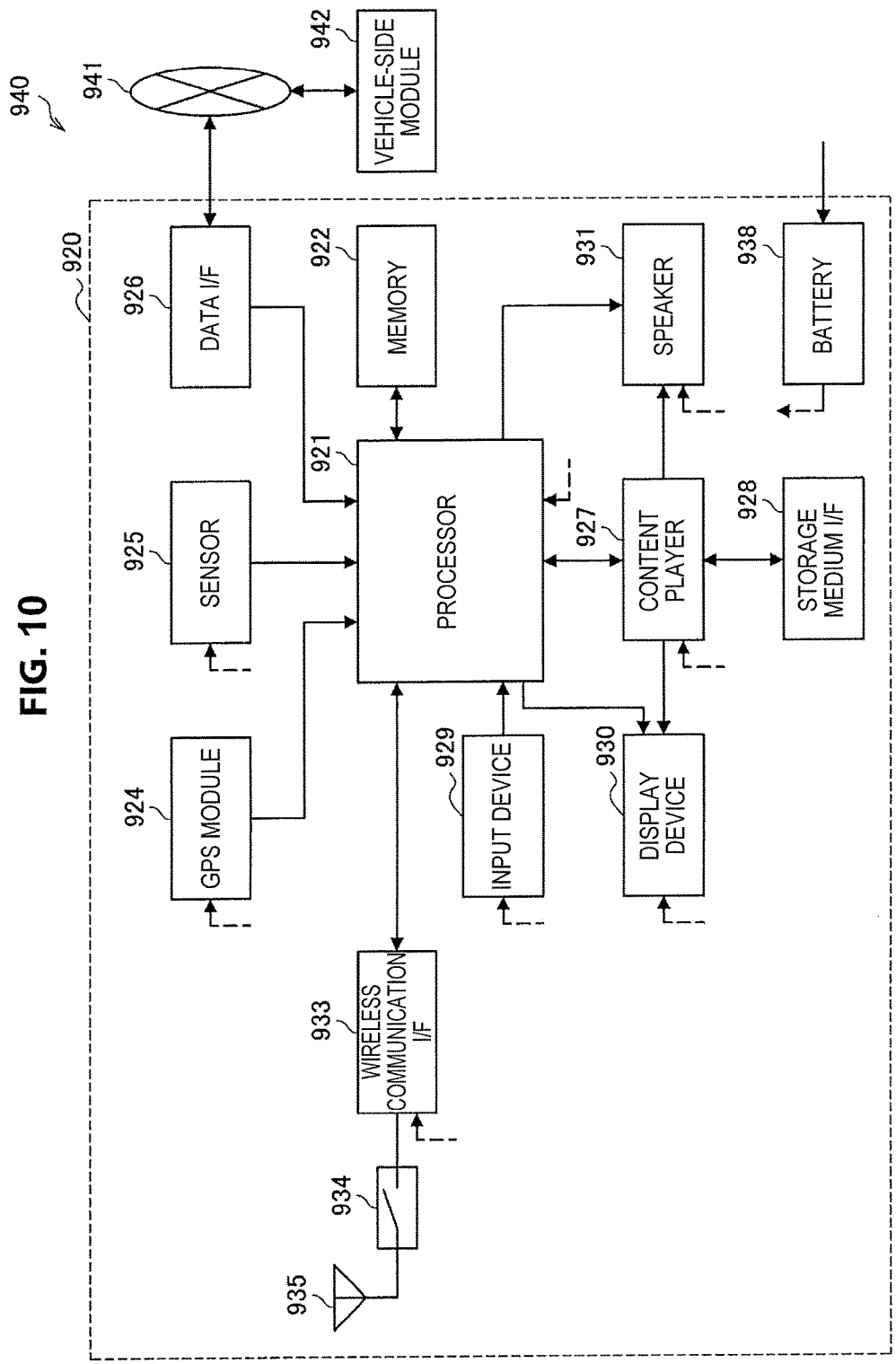
FIG. 10 is a block diagram illustrating an example of a schematic configuration of a car navigation device.

FIG. 10 is a block diagram showing an example of a schematic configuration of a car navigation device 920 to which the technology of the present disclosure can be applied. The car navigation device 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes a RAM and a ROM storing programs executed by the processor 921 and data.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, an air pressure sensor, and the like. The data interface 926 is connected to an in-vehicle network 941 via, for example, a terminal that is not illustrated to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad, to execute wireless LAN communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation device 920 may include a plurality of antennas, without being limited to the example of FIG. 10. In this case, the antenna switch 934 may be omitted from the configuration of the car navigation device 920.

The battery 938 supplies electric power to each of the blocks of the car navigation device 920 shown in FIG. 10 via power supply lines partially indicated by dashed lines in the drawing. In addition, the battery 938 accumulates electric power supplied from the vehicle.

In the car navigation device 920 illustrated in FIG. 10, the data processing unit 11, the wireless communication unit 12, the control unit 13, and the storage unit 14 described using FIG. 4 may be implemented by the wireless communication interface 933. In addition, at least some of the functions may be implemented by the processor 921. For example, when the control unit 13 sets a communication frequency on the basis of frequency allocation information included in a received CA frame, a delivery acknowledgment frame can be transmitted and received using frequency division multiple access in multicast communication. Accordingly, reinforcement of reliability of a multicast frame and effective utilization of wireless communication resources can be compatible.

In addition, the wireless communication interface 933 may operate as the above-described AP 10 and provide wireless connection to a terminal of the user who is on board the vehicle. At this time, for example, when the control unit 13 transmits a CA frame after transmitting a multicast frame and before transmitting a delivery acknowledgment frame via the data processing unit 11 and the wireless communication unit 12, the delivery acknowledgment frame can be transmitted and received using frequency division multiple access in multicast communication. Accordingly, reinforcement of reliability of a multicast frame and effective utilization of wireless communication resources can be compatible.

Further, the technology of the present disclosure may be realized as an in-vehicle system (or a vehicle) 940 including one or more blocks of the above-described car navigation device 920, an in-vehicle network 941, and a vehicle-side module 942. The vehicle-side module 942 generates vehicle-side data such as a vehicle speed, the number of engine rotations, or failure information and outputs the generated data to the in-vehicle network 941.

3-3. Third Application Example

Figure 11:
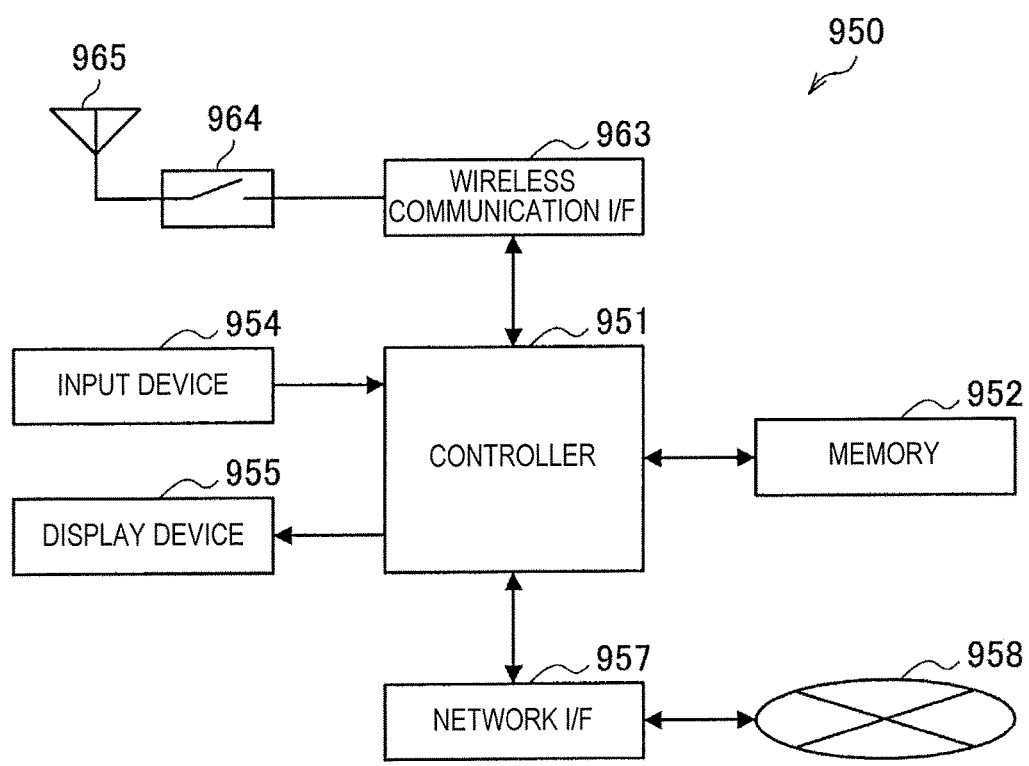
FIG. 11 is a block diagram illustrating an example of a schematic configuration of a wireless access point.

FIG. 11 is a block diagram showing an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes a RAM and a ROM and stores a program executed by the controller 951 and various kinds of control data (for example, a terminal list, a routing table, an encryption key, security settings, and a log).

The input device 954 includes, for example, a button, a switch, or the like, and receives a manipulation from a user. The display device 955 includes an LED lamp or the like and displays an operation status of the wireless access point 950.

The network interface 957 is a wired communication interface that connects the wireless access point 950 to a wired communication network 958. The network interface 957 may include a plurality of connection terminals. The wired communication network 958 may be a LAN such as Ethernet (registered trademark) or may be a Wide Area Network (WAN).

The wireless communication interface 963 supports one or more wireless LAN standards of IEEE 802.11a, 11b, 11g, 11n, 11ac, and 11ad, to supply wireless connection to a nearby terminal as an access point. The wireless communication interface 963 can typically include a baseband processor, an RF circuit, and a power amplifier. The wireless communication interface 963 may be a one-chip module in which a memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

In the wireless access point 950 illustrated in FIG. 11, the data processing unit 11, the wireless communication unit 12, the control unit 13, and the storage unit 14 described using FIG. 4 may be implemented by the wireless communication interface 963. In addition, at least some of the functions may be implemented by the controller 951. For example, when the control unit 13 transmits a CA frame after transmitting a multicast frame and before transmitting a delivery acknowledgment frame via the data processing unit 11 and the wireless communication unit 12, the delivery acknowledgment frame can be transmitted and received using frequency division multiple access in multicast communication. Accordingly, reinforcement of reliability of a multicast frame and effective utilization of wireless communication resources can be compatible.

4. CONCLUSION

According to the above-described embodiment of the present disclosure, when a delivery acknowledgment with respect to a multicast frame is given using frequency division multiplexing communication, wireless communication resources can be more effectively utilized while reliability of multicast communication is reinforced in comparison to a case where a delivery acknowledgment is given using time division multiplexing communication.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, although the information indicating the TSFv is stored in the CA frame as the timer information in the above-described embodiment, the present technology is not limited thereto. For example, information indicating a degree of roundness of the TSFv may be stored in the CA frame. In this case, the amount of data of the CA frame is more reduced than when a value indicating the TSFv is included in the CA frame, and thus the amount of communication is reduced and thus wireless communication resources can be effectively utilized.

In addition, although the example in which both the primary channel information and the bandwidth information are included in the CA frame has been described in the above-described embodiment, only the primary channel information may be included therein. For example, only the primary channel information is included in the CA frame in a case where the STA 20 has already ascertained a bandwidth allocated thereto. In this case, since the amount of data of the CA frame is reduced more than a case where the bandwidth information is included in the CA frame, the amount of communication is reduced, and thus wireless communication resources can be effectively utilized.

In addition, although the example in which the CA frame includes the timer information has been described in the above-described embodiment, the timer information may not be included in the CA frame. Specifically, the STA 20 sets the communication frequency back to an original frequency in a pre-determined time. For example, the STA 20 sets the communication frequency back to the original after a time stipulated in a communication standard or the like elapses from the reception of the CA frame. In this case, since the amount of data of the CA frame is reduced more than the case where the timer information is included in the CA frame, the amount of communication is reduced and thus wireless communication resources can be effectively utilized.

In addition, although the example in which the primary channel information is information indicating a center frequency or information of the calculation formula has been described in the above-described embodiment, the primary channel information may be information indicating a channel number. In this case, the STA 20 specifies the center frequency using the channel number indicated by the primary channel information.

In addition, although the example in which the acknowledgment response frame is frequency-division multiplexed has been described in the above-described embodiment, the acknowledgment response frame may be space-division multiplexed.

In addition, although the example in which the CA field of the CA frame is included in the payload has been described in the above-described embodiment, the CA field may be included in the PHY header or the MAC header.

In addition, although the example in which one BA frame is transmitted after one other BAR frame transmitted has been described in the above-described embodiment, a plurality of BA frames may be transmitted together after another plurality of BAR frames are transmitted together. For example, the BA frames that are frequency-division multiplexed may be transmitted after the BAR frames are transmitted in the multicast scheme or consecutively transmitted in the unicast scheme.

In addition, although the example in which the CA frame is transmitted in the multi cast frame has been described in the above-described embodiment, the CA frame may be transmitted to each of the STAs 20 in the unicast scheme. Furthermore, the CA frame may be transmitted as a frame in which frames destined for each of the STAs 20 are aggregated.

In addition, although the example in which the STA 20 sets the communication frequency on the basis of the frequency allocation information included in the CA frame transmitted each time a delivery acknowledgment is given has been described in the above-described embodiment, the STA 20 may continuously use the set communication frequency regardless of the reception of the CA frame.

In addition, although the example in which only the delivery acknowledgment frame is frequency-division multiplexed has been described in the above-described embodiment, other frames may be frequency-division multiplexed in addition to the delivery acknowledgment frame. For example, a BAR frame and a data frame can be frequency-division multiplexed.

In addition, although the example in which the multicast frame is one frame destined for one or a plurality of communication apparatuses has been described in the above-described embodiment, the multicast frame may include a plurality of frames. For example, the multicast frame can be a frame in which a plurality of frames that are destined for each of different communication apparatuses are space-division multiplexed or frequency-division multiplexed.

In addition, although the example in which there are vacancies in the band has been described with reference to FIG. 5 in the above-described embodiment, it is desirable to allocate wireless communication resources so as not to generate vacancies in the band.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
A communication apparatus including:
a communication unit configured to perform communication of a frame,
in which the communication unit
transmits a frequency allocation frame, which includes frequency allocation information that specifies a transmission frequency of a delivery acknowledgment response frame with respect to a multicast frame, and
receives the delivery acknowledgment response frame that is transmitted in the transmission frequency specified by the frequency allocation information and is frequency-division multiplexed.

(2)
The communication apparatus according to (1),
in which the communication unit transmits a delivery acknowledgment request frame with respect to the delivery acknowledgment response frame using the transmission frequency specified by the frequency allocation information, and
the delivery acknowledgment request frame is frequency-division multiplexed.

(3)
The communication apparatus according to (2), in which the frequency allocation information includes information that specifies a center frequency of the transmission frequency.

(4)
The communication apparatus according to (3), in which the center frequency is different between destinations of the delivery acknowledgment request frame transmitted in the same period.

(5)
The communication apparatus according to (3) or (4), in which the center frequency is specified on the basis of at least one of identification information of a destination of the delivery acknowledgment request frame and time information of the communication apparatus.

(6)
The communication apparatus according to any one of (3) to (5), in which the center frequency is different from a center frequency of a multicast frame.

(7)
The communication apparatus according to any one of (3) to (6), in which the frequency allocation information includes information that specifies a bandwidth of the transmission frequency.

(8)
The communication apparatus according to (7), in which the bandwidth is different between at least some of destinations of the delivery acknowledgment request frame.

(9)
The communication apparatus according to (7) or (8), in which a bandwidth used to transmit the delivery acknowledgment request frame in the same period is different from a bandwidth of a multicast frame.

(10)
The communication apparatus according to any one of (2) to (9), in which the frequency allocation frame includes setting period information that specifies a period in which the transmission frequency specified by the frequency allocation information is to be set to a communication frequency.

(11)
The communication apparatus according to any one of (2) to (10), in which the communication unit transmits a frequency allocation frame before transmitting the delivery acknowledgment request frame with respect to the delivery acknowledgment response frame.

(12)
The communication apparatus according to (11), in which the communication unit transmits the frequency allocation frame when a communication connection with a destination of the delivery acknowledgment request frame is established.

(13)
The communication apparatus according to any one of (2) to (12), in which the delivery acknowledgment response frame is additionally time-division multiplexed on the basis of the number of transmission destinations of the delivery acknowledgment request frame and received.

(14)
A communication apparatus including:
a communication unit configured to perform communication of a frame,
in which the communication unit
receives a frequency allocation frame, which includes frequency allocation information that specifies a transmission frequency of a delivery acknowledgment response frame with respect to a multicast frame, and transmits the delivery acknowledgment response frame using the transmission frequency specified by the frequency allocation information, and the delivery acknowledgment response frame is frequency-division multiplexed.

(15)

The communication apparatus according to (14), further including:

a control unit configured to set a communication frequency of the communication apparatus to the transmission frequency specified by the frequency allocation information, in which the communication unit receives a delivery acknowledgment request frame with respect to the delivery acknowledgment response frame that is transmitted in the transmission frequency specified by the frequency allocation information and is frequency-division multiplexed.

(16)

The communication apparatus according to (15), in which the control unit performs the setting when the frequency allocation frame is received.

(17)

The communication apparatus according to (15) or (16), in which the communication unit receives the multicast frame, and the control unit performs the setting on the basis of information regarding a start of a delivery acknowledgment period.

(18)

The communication apparatus according to any one of (15) to (17), in which the frequency allocation frame includes setting period information that specifies a period in which a communication frequency is to be set as the transmission frequency specified by the frequency allocation information, and the control unit sets a communication frequency of the communication apparatus back to a communication frequency before the setting after the period specified by the setting period information elapses.

(19)

A communication method performed by a communication unit, the method including:

performing communication of a frame;

transmitting a frequency allocation frame, which includes frequency allocation information that specifies a transmission frequency of a delivery acknowledgment response frame with respect to a multicast frame; and receiving the delivery acknowledgment response frame that is transmitted in the transmission frequency specified by the frequency allocation information and is frequency-division multiplexed.

(20)

A communication method performed by a communication unit, the method including:

performing communication of a frame;

receiving a frequency allocation frame, which includes frequency allocation information that specifies a transmission frequency of a delivery acknowledgment response frame with respect to a multicast frame; and transmitting the delivery acknowledgment response frame using the transmission frequency specified by the frequency allocation information, in which the delivery acknowledgment response frame is frequency-division multiplexed.

REFERENCE SIGNS LIST 10 communication apparatus or AP
11 data processing unit
12 wireless communication unit
13 control unit
14 storage unit
20 communication apparatus or STA

The invention claimed is:

1. A communication apparatus comprising:
one or more circuits configured to perform communication of a frame,
wherein the one or more circuits are configured to
transmit a frequency allocation frame, which includes frequency allocation information that specifies a transmission frequency of a delivery acknowledgment response frame with respect to a multicast frame, and
receive the delivery acknowledgment response frame that is transmitted in the transmission frequency specified by the frequency allocation information and is frequency-division multiplexed, wherein the one or more circuits are configured to transmit a delivery acknowledgment request frame with respect to the delivery acknowledgment response frame using the transmission frequency specified by the frequency allocation information, the delivery acknowledgment request frame being transmitted to one or a subset of devices that is selected to reply with the delivery acknowledgement response frame, and
the delivery acknowledgment request frame is frequency-division multiplexed, wherein
the frequency allocation information includes information that specifies a bandwidth of the transmission frequency,
the bandwidth is different between at least some of destinations of the delivery acknowledgment request frame, and
a bandwidth used to transmit the delivery acknowledgment request frame in the same period is different from a bandwidth of a multicast frame.

2. The communication apparatus according to claim 1, wherein the frequency allocation information includes information that specifies a center frequency of the transmission frequency.

3. The communication apparatus according to claim 2, wherein the center frequency is different between destinations of the delivery acknowledgment request frame transmitted in the same period.

4. The communication apparatus according to claim 2, wherein the center frequency is specified on the basis of at least one of identification information of a destination of the delivery acknowledgment request frame or time information of the communication apparatus.

5. The communication apparatus according to claim 2, wherein the center frequency is different from a center frequency of a multicast frame.

6. The communication apparatus according to claim 1, wherein the frequency allocation frame includes setting period information that specifies a period in which the transmission frequency specified by the frequency allocation information is to be set to a communication frequency.

7. The communication apparatus according to claim 1, wherein the one or more circuits are configured to transmit a frequency allocation frame before transmitting the delivery acknowledgment request frame with respect to the delivery acknowledgment response frame.

8. The communication apparatus according to claim 7, wherein the one or more circuits are configured to transmit the frequency allocation frame when a communication connection with a destination of the delivery acknowledgment request frame is established.

9. The communication apparatus according to claim 1, wherein the delivery acknowledgment response frame is additionally time-division multiplexed on the basis of the number of transmission destinations of the delivery acknowledgment request frame and received.

10. A communication apparatus comprising:
one or more circuits configured to perform communication of a frame,
wherein the one or more circuits are further configured to
receive a frequency allocation frame, which includes frequency allocation information that specifies a transmission frequency of a delivery acknowledgment response frame with respect to a multicast frame, and
transmit the delivery acknowledgment response frame using the transmission frequency specified by the frequency allocation information, and
the delivery acknowledgment response frame is frequency-division multiplexed, wherein
the one or more circuits are configured to receive a delivery acknowledgment request frame with respect to the delivery acknowledgment response frame that is transmitted in the transmission frequency specified by the frequency allocation information, the delivery acknowledgement request frame being transmitted in response to a delivery acknowledgment request frame that selectively identifies the communication apparatus for replying with the delivery acknowledgment request frame, and
the delivery acknowledgment request frame is frequency-division multiplexed, wherein
the frequency allocation information includes information that specifies a bandwidth of the transmission frequency,
the bandwidth is different between at least some of destinations of the delivery acknowledgment request frame, and
a bandwidth used to transmit the delivery acknowledgment request frame in the same period is different from a bandwidth of a multicast frame.

11. The communication apparatus according to claim 10, wherein
the one or more circuits are further configured to set a communication frequency of the communication apparatus to the transmission frequency specified by the frequency allocation information,
receives the delivery acknowledgment request frame with respect to the delivery acknowledgment response frame that is transmitted in the transmission frequency specified by the frequency allocation information and is frequency-division multiplexed.

12. The communication apparatus according to claim 11, wherein the one or more circuits are further configured to perform the setting when the frequency allocation frame is received.

13. The communication apparatus according to claim 11, wherein the one or more circuits are further configured to
receive the multi cast frame, and
perform the setting on the basis of information regarding a start of a delivery acknowledgment period.

14. The communication apparatus according to claim 11, wherein the frequency allocation frame includes setting period information that specifies a period in which a communication frequency is to be set as the transmission frequency specified by the frequency allocation information, and
the one or more circuits set a communication frequency of the communication apparatus back to a communication frequency before the setting after the period specified by the setting period information elapses.

15. A communication method performed by one or more circuits, the method comprising:
performing communication of a frame;
transmitting a frequency allocation frame, which includes frequency allocation information that specifies a transmission frequency of a delivery acknowledgment response frame with respect to a multicast frame;
receiving the delivery acknowledgment response frame that is transmitted in the transmission frequency specified by the frequency allocation information and is frequency-division multiplexed; and
transmitting a delivery acknowledgment request frame with respect to the delivery acknowledgment response frame using the transmission frequency specified by the frequency allocation information, wherein
the delivery acknowledgment request frame being transmitted to one or a subset of devices that is selected to reply with the delivery acknowledgement response frame,
the delivery acknowledgment request frame is frequency-division multiplexed, wherein
the frequency allocation information includes information that specifies a bandwidth of the transmission frequency,
the bandwidth is different between at least some of destinations of the delivery acknowledgment request frame, and
a bandwidth used to transmit the delivery acknowledgment request frame in the same period is different from a bandwidth of a multicast frame.

16. A communication method performed by one or more circuits of a communication apparatus, the method comprising:
performing communication of a frame;
receiving a frequency allocation frame, which includes frequency allocation information that specifies a transmission frequency of a delivery acknowledgment response frame with respect to a multicast frame; and
transmitting the delivery acknowledgment response frame using the transmission frequency specified by the frequency allocation information, and
receiving a delivery acknowledgment request frame with respect to the delivery acknowledgment response frame that is transmitted in the transmission frequency specified by the frequency allocation information, wherein
the delivery acknowledgement request frame being transmitted in response to a delivery acknowledgment request frame that selectively identifies the communication apparatus for replying with the delivery acknowledgment request frame, and
the delivery acknowledgment request frame is frequency-division multiplexed and the delivery acknowledgment response frame is frequency-division multiplexed, wherein
the frequency allocation information includes information that specifies a bandwidth of the transmission frequency, the bandwidth is different between at least some of destinations of the delivery acknowledgment request frame, and a bandwidth used to transmit the delivery acknowledgment request frame in the same period is different from a bandwidth of a multicast frame.

\* \* \* \* \*

UNITED STATES PATENT AND TRADEMARK OFFICE
CERTIFICATE OF CORRECTION

PATENT NO.        : 10,411,867 B2
APPLICATION NO.   : 15/562953
DATED             : September 10, 2019
INVENTOR(S)       : Eisuke Sakai et al.

Page 1 of 1

It is certified that error appears in the above-identified patent and that said Letters Patent is hereby corrected as shown below:

In the Claims

Column 27, Line 32, "request" should be --response--;

Column 27, Line 33, "a" should be --the--;

Column 27, Line 35, "request" should be --response--;

Column 28, Line 56, "request" should be --response--;

Column 28, Line 57, "a" should be --the--;

Column 28, Line 60, "request" should be --response--.

Signed and Sealed this
Twenty-ninth Day of October, 2019

Andrei Iancu
*Director of the United States Patent and Trademark Office*